United States Patent
Fukushima (10) Patent No.: US 8,711,359 B2
(45) Date of Patent: Apr. 29, 2014

(54) DELAY INTERFEROMETER USING MAGNETO-OPTIC EFFECT OF A VARIABLE FARADAY ROTATOR

(75) Inventor: Nobuhiro Fukushima, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 776 days.

(21) Appl. No.: 12/923,721

(22) Filed: Oct. 5, 2010

(65) Prior Publication Data

US 2011/0096338 A1    Apr. 28, 2011

(30) Foreign Application Priority Data

Oct. 27, 2009   (JP) ................... 2009-246815

(51) Int. Cl.
*G01B 9/02*   (2006.01)
*H04B 10/00*   (2013.01)

(52) U.S. Cl.
USPC ........................................ 356/450; 398/212

(58) Field of Classification Search
USPC ............ 356/491–495, 450; 398/65, 152, 188, 398/147, 202–214
See application file for complete search history.

(56) References Cited

U.S. PATENT DOCUMENTS 4,444,503 A * 4/1984 Schiffner .................. 356/460
2007/0264029 A1  11/2007 Suzuki et al.

FOREIGN PATENT DOCUMENTS

JP   2007-306371    11/2007

* cited by examiner

*Primary Examiner* — Hwa Lee
(74) *Attorney, Agent, or Firm* — Staas & Halsey LLP (57) ABSTRACT

A delay interferometer includes first and second optical paths into which incident signal light is split, a first converter including one or more conversion parts to convert the signal light on the first optical path into circularly polarized light and to convert the circularly polarized light into linearly polarized signal light, a phase adjuster to shift an optical phase of the circularly polarized light through a magneto-optic effect, and a second converter to convert a polarization state of the signal light on the second optical path into substantially the same polarization state as a polarization state of the linearly polarized signal light.

10 Claims, 12 Drawing Sheets

| INCIDENT | B1 | ↕ ↔ | |
|---|---|---|---|
| SPLITTER | B2 | ↕ ↔ | |
| POLARIZATION SEPARATION FILM IN D PRISM | B2b (VERTICAL) ↕ | B2a (HORIZONTAL) ↔ | |
| EXITING FROM D PRISM | VERTICAL ↕ | HORIZONTAL ↔ | |
| EXITING FROM QUARTER WAVELENGTH PLATE | RIGHT-HANDED CIRCULARLY POLARIZED LIGHT | RIGHT-HANDED CIRCULARLY POLARIZED LIGHT | |
| INSIDE FARADAY ROTATOR | RIGHT-HANDED CIRCULARLY POLARIZED LIGHT | RIGHT-HANDED CIRCULARLY POLARIZED LIGHT | |
| (OR INSIDE FARADAY ROTATOR WITH MODIFIED MAGNETIC FIELD) | RIGHT-HANDED CIRCULARLY POLARIZED LIGHT (PHASE ADVANCED) | RIGHT-HANDED CIRCULARLY POLARIZED LIGHT (PHASE ADVANCED) | |
| REFLECTION BY FIRST REFLECTOR | LEFT-HANDED CIRCULARLY POLARIZED LIGHT | LEFT-HANDED CIRCULARLY POLARIZED LIGHT | |
| INSIDE FARADAY ROTATOR | LEFT-HANDED CIRCULARLY POLARIZED LIGHT | LEFT-HANDED CIRCULARLY POLARIZED LIGHT | |
| (OR INSIDE FARADAY ROTATOR WITH MODIFIED MAGNETIC FIELD) | LEFT-HANDED CIRCULARLY POLARIZED LIGHT (PHASE ADVANCED) | LEFT-HANDED CIRCULARLY POLARIZED LIGHT (PHASE ADVANCED) | |
| EXITING FROM QUARTER WAVELENGTH PLATE | B2b' (HORIZONTAL) ↔ | B2a' (VERTICAL) ↕ | |
| POLARIZATION SEPARATION FILM IN D PRISM | HORIZONTAL ↔ | VERTICAL ↕ | |
| EXITING FROM D PRISM | B4 | ↔ ↕ | |
| SPLITTER | | ↔ ↕ | |
| OUTPUT | OUTPUT1 ↔ ↕ | OUTPUT2 ↔ ↕ | |

| | SECOND OPTICAL PATH |
|---|---|
| TRANSMITTED LIGHT | B3 ↕ ↔ |
| EXITING FROM QUARTER WAVELENGTH PLATE | RIGHT-HANDED CIRCULARLY POLARIZED LIGHT |
| SECOND REFLECTOR | RIGHT-HANDED CIRCULARLY POLARIZED LIGHT |
| EXITING FROM QUARTER WAVELENGTH PLATE | B5 ↔ ↕ |

DELAY INTERFEROMETER USING MAGNETO-OPTIC EFFECT OF A VARIABLE FARADAY ROTATOR

CROSS-REFERENCE TO RELATED APPLICATIONS

The present application is based upon and claims the benefit of priority from the prior Japanese Patent Application No. 2009-246815 filed on Oct. 27, 2009, with the Japanese Patent Office, the entire contents of which are incorporated herein by reference.

FIELD

The embodiments herein relate to a delay interferometer, a receiver, and a method of producing delayed interference.

BACKGROUND

Optical modulation schemes such as DPSK (i.e., differential binary phase shift keying) modulation, DQPSK (i.e., differential quadrature phase shift keying) modulation, and the like have been attracting attention as a technology that is capable of achieving a high-bit-rate optical transmission in the range of 40 G/s per wavelength or more. A receiver used in phase modulation schemes such as DPSK and DQPSK employs a delay interferometer for detecting phase information.

A delay interferometer uses two optical beams to interfere with each other, and a phase difference between these two beams may be stabilized with precision in the range of $1/100$ of the wavelength. Typically, temperature-based control is utilized to adjust a phase difference. For example, a phase compensator that is made of a material having a thermo-optical effect such as refractive-index-temperature dependency is known to be used in a delayed interferometer.

However, phase adjustment based on temperature control may have a slow response speed because heat is applied to a material having a thermo-optical effect for expansion.

[Patent Document 1] Japanese Laid-open Patent Publication No. 2007-306371

SUMMARY

According to one aspect, a delay interferometer includes first and second optical paths into which incident signal light is split, a first converter including one or more conversion parts to convert the signal light on the first optical path into circularly polarized light and to convert the circularly polarized light into linearly polarized signal light, a phase adjuster to shift an optical phase of the circularly polarized light through a magneto-optic effect, and a second converter to convert a polarization state of the signal light on the second optical path into substantially the same polarization state as a polarization state of the linearly polarized signal light.

According to another aspect, a method of producing delayed interference includes splitting incident signal light into first light and second light, converting the first light into circularly polarized light, adjusting an optical phase of the circularly polarized light through a magneto-optic effect, converting the phase-adjusted circularly polarized light into linearly polarized light, placing the second light in substantially the same polarization state as a polarization state of the linearly polarized light, and causing the linearly polarized light and the second light having substantially the same polarization state to interfere with each other.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments will be described in detail by referring to the accompanying drawings.

First Embodiment

A delay interferometer disclosed herein utilizes a magneto-optic effect to perform phase adjustment. Faraday rotation may be the most well-known and practically used effect among various magneto-optic effects. As an example of a means to perform phase adjustment, a delay interferometer disclosed herein utilizes a variable Faraday rotator (i.e., VFR).

Faraday rotator is typically understood as rotation of linearly polarized light. It may be noted, however, that Faraday rotation may also be defined as a physical phenomenon occurring with respect to a circularly polarized light. Faraday rotation may provide a phase difference or a difference in optical path length between right-handed circularly polarized light and left-handed circularly polarized light.

Faraday rotation brings about a difference in optical path length with respect to circularly polarized light, which is $\lambda\theta/2\pi$ for a wavelength of $\lambda$ and a rotation angle of $\theta$ (expressed in radian). An optical path length may thus be adjusted by directing circularly polarized light into a variable Faraday rotator. The variable Faraday rotator is used to perform phase adjustment by utilizing the fact that an optical path length is provided with respect to circularly polarized light.

Figure 1:
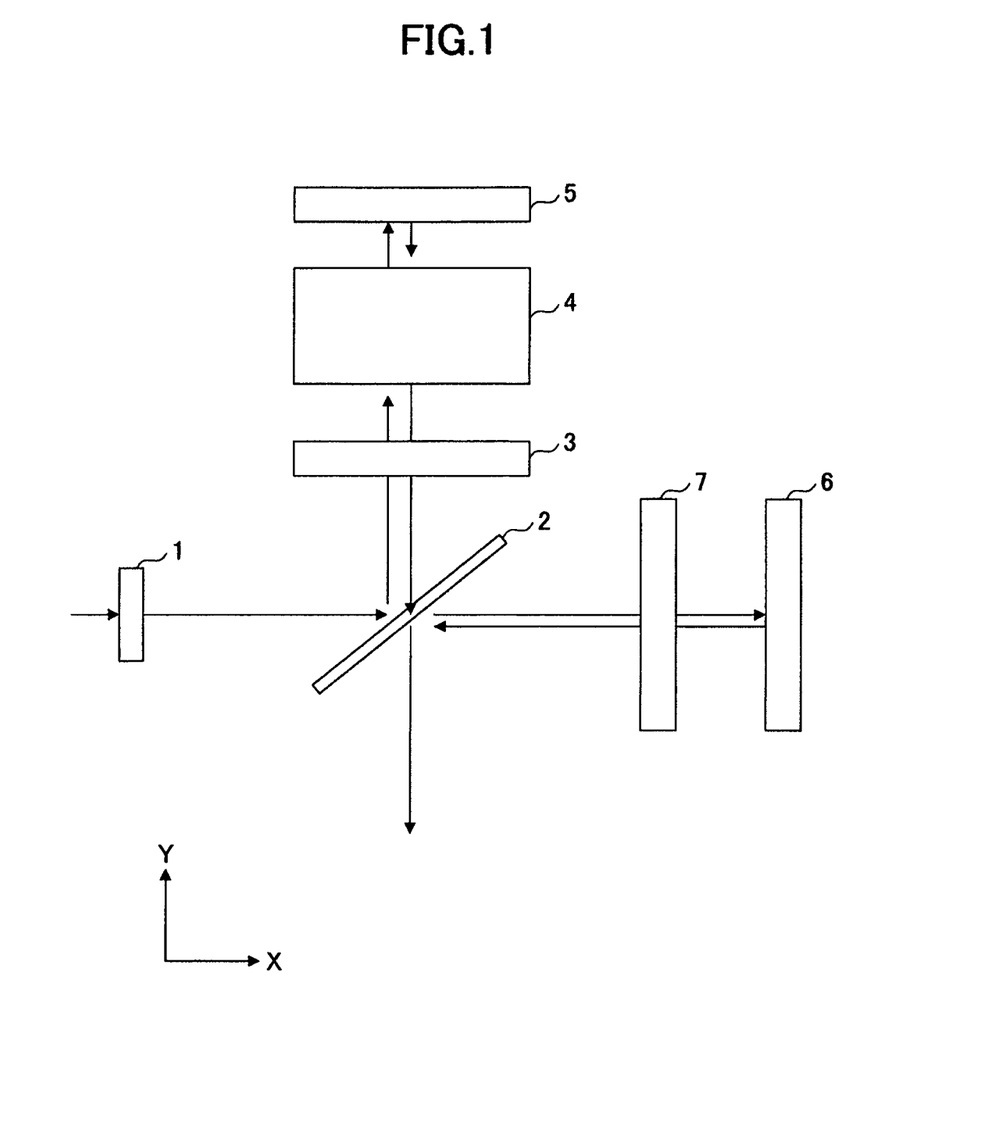
FIG. 1 is a drawing illustrating an example of a basic configuration of a delay interferometer according to a first embodiment.

FIG. 1 is a drawing illustrating an example of a basic configuration of a delay interferometer according to the first embodiment. The delay interferometer illustrated in FIG. 1 includes a first lens 1, a splitter 2, a quarter wavelength plate 3, a quarter wavelength plate 7, a variable Faraday rotator 4, a first reflector 5, and a second reflector 6. The delay interferometer illustrated in FIG. 1 may be an example of an asymmetrical Mickelson interferometer.

The first lens 1, for example, may be a collimate lens, and converts DPSK-modulated incident light arriving through an optical fiber into a parallel light beam for transmission to the splitter 2. The light beam may hereinafter be also referred to as "signal light".

The splitter 2, for example, may be a half-mirror, which may preferably be a half-mirror having no polarization dependency. The splitter 2 splits the parallel light coming from the first lens 1 so that reflected light travels in the Y-axis direction, and transmitted light travels in the X-axis direction.

The quarter wavelength plate 3 converts the reflected light having linear polarization into circularly polarized light. The quarter wavelength plate 3 also converts circularly polarized light reflected by the first reflector 5 into linearly polarized light. The linearly polarized light exiting from the quarter wavelength plate 3 is orthogonal to the linearly polarized light that is incident to the quarter wavelength plate 3. The quarter wavelength plate 3 may alternatively be a birefringent crystal such as berg crystal or liquid crystal that provides a ¾ phase difference or a ¼+n/2 phase difference in general. Any material that can convert linearly polarized light into circularly polarized light may be used. The same also applies in the case of other quarter wavelength plates. Further, the term "circular polarization" or "circularly polarized light" may include elliptic polarization or elliptically polarized light, which deviates from a complete circle to the extent that does not undermine system efficiency.

The variable Faraday rotator 4 is configured such that magneto-optic crystal such as RIG (i.e., rare-earth iron garnet) is placed in the magnetically saturated state to change the direction of magnetization for the purpose of providing continuous changes in the Faraday rotation angle. With this arrangement, the variable Faraday rotator 4 may serve to adjust the optical path length of circularly polarized light that is incident thereto.

The first reflector 5, for example, may be a mirror, and reflects the phase-adjusted circularly polarized light towards the variable Faraday rotator 4. The second reflector 6 may, for example, be a mirror, and reflects circularly polarized light towards the quarter wavelength plate 7.

The quarter wavelength plate 7 converts the transmitted light having linear polarization into circularly polarized light. The quarter wavelength plate 7 also converts the circularly polarized light reflected by the first reflector 6 into linearly polarized light. The linearly polarized light exiting from the quarter wavelength plate 7 is orthogonal to the linearly polarized light that is incident to the quarter wavelength plate 7.

The splitter 2 combines the reflected light reflected by the first reflector 5 and phase-adjusted by the variable Faraday rotator 4 with the transmitted light reflected by the second reflector 6. The combined light is transmitted from the splitter 2. In this instance, the splitter 2 serves as an optical coupler.

The quarter wavelength plate 7 is provided between the splitter 2 and the second reflector 6 for the purpose of aligning the state of polarization between the transmitted light and the reflected light that are combined by the splitter 2.

The above-described configuration allows optical phase adjustment to be performed by use of a magneto-optic effect in a delayed interferometer. However, no polarization state is usually specified with respect to signal light that is received by a PD (i.e., photodiode). In consideration of this, the range of application may be broadened by providing a delay interferometer that is applicable to any polarization state. In the following, a description will be given of a delay interferometer that has no polarization dependency.

Figure 2:
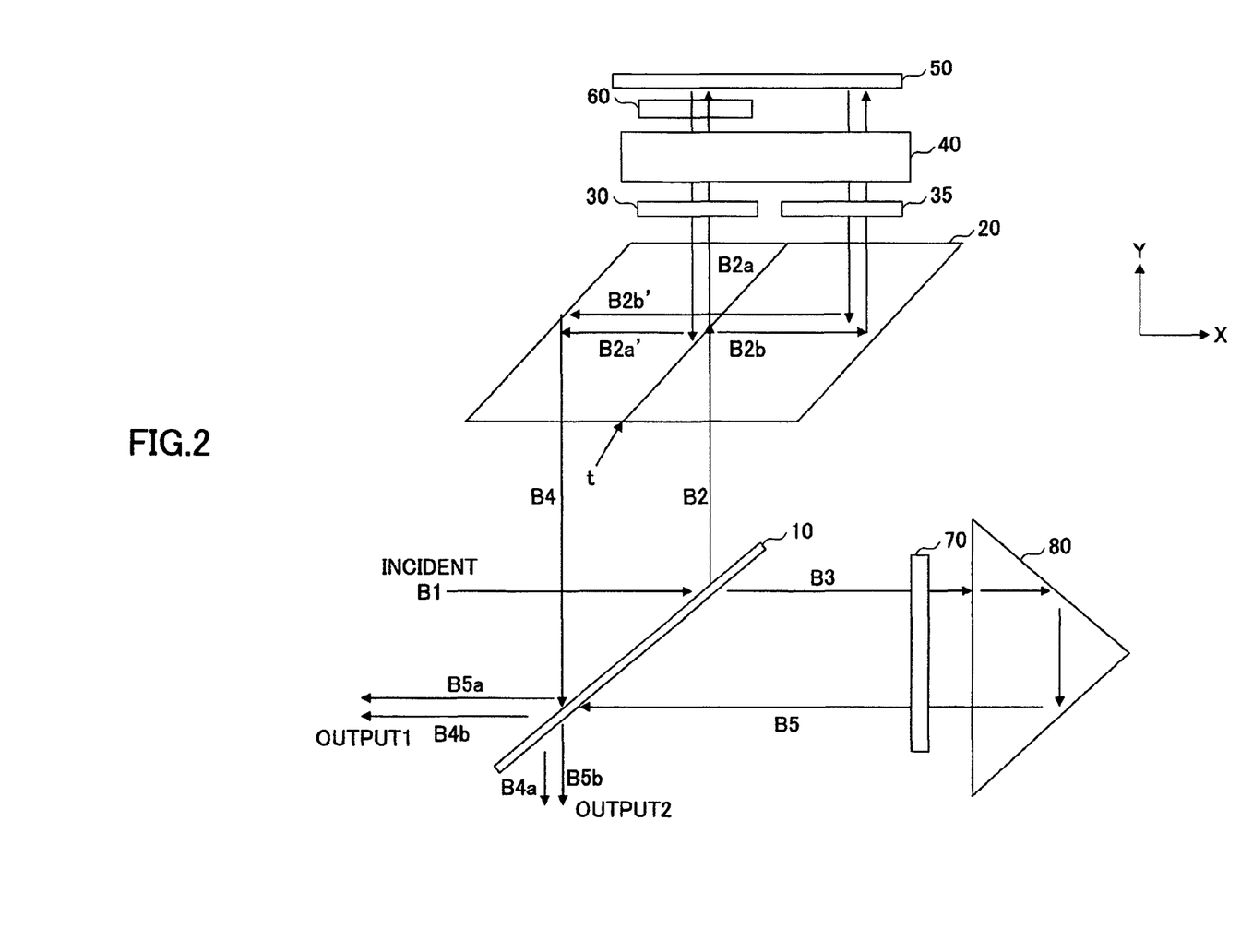
FIG. 2 is a drawing illustrating an example of the configuration of the delay interferometer according to the first embodiment.

FIG. 2 is a drawing illustrating an example of the configuration of the delay interferometer according to the first embodiment. The delay interferometer illustrated in FIG. 2 includes a splitter 10, a polarization diversity prism 20, a quarter wavelength plate 30, a quarter wavelength plate 35, a quarter wavelength plate 70, a variable Faraday rotator 40, a first reflector 50, a delay correction plate 60, and a second reflector 80. The delay interferometer illustrated in FIG. 2 uses a right-angle prism as the second reflector 80 to provide a positional displacement between an incident light path and an exiting light path, which makes it easier to detect the output light.

The splitter 10, the variable Faraday rotator 40, and the first reflector 50 are equivalent to the splitter 2, the variable Faraday rotator 4, and the first reflector 5 illustrated in FIG. 1, respectively, and a description thereof will be omitted. The splitter 10 splits incident signal light (which may hereinafter be referred to also as "incident light") B1 into reflected light B2 and transmitted light B3.

The polarization diversity prism 20 has a polarization separation film (e.g., dielectric multilayer film) that is situated at a joint face t. When the reflected light B2 shines on the polarization separation film, p-polarized light B2a passes through, and s-polarized light B2b is reflected. In the example illustrated in FIG. 2, the polarization diversity prism 20 is situated between the splitter 10 and the first reflector 50 along the optical path of the reflected light B2, which may be referred to as a first optical path.

The polarization diversity prism 20 further combines optically-phase-adjusted polarized light B2a' with optically-phase-adjusted polarized light B2b' into reflected light B4, which is transmitted towards the splitter 10. The linearly polarized light incident to the quarter wavelength plates 30 and 35 are orthogonal to the linearly polarized light exiting from the quarter wavelength plates 30 and 35, respectively. In the polarization diversity prism 20, thus, the p-polarized light on the outbound path is the s-polarized light on the return path, and the s-polarized light on the outbound path is the p-polarized light on the return path.

Namely, the s-polarized light reflected by the polarization separation film on the outbound path passes through the polarization separation film as the p-polarized light on the return path. Also, the p-polarized light passing through the polarization separation film on the outbound path is reflected by the polarization separation film as the s-polarized light on the return path. With this arrangement, the reflected light B2 incident to the polarization diversity prism 20 is situated at a different position than the reflected light B4 exiting from the polarization diversity prism 20. The positional displacement of these light beams is designed to be substantially the same as (i.e., the same as or similar to) the positional displacement that is created by the second reflector 80 (e.g., right-angle prism). Since the positions of light beams are different between the reflected light B2 and the reflected light B4, it is easy to detect (i.e., extract) one of the two light beams.

The quarter wavelength plate 30 and the quarter wavelength plate 35 have approximately a 90-degree difference in their respective axial directions. In order to use a single variable Faraday rotator 40 for adjusting phases of two light beams, the same rotation direction of circular polarization may be set with respect to these two light beams. When linearly polarized light beams orthogonal to each other are incident to the quarter wavelength plates 30 and 35, respectively, circularly polarized light beams having the same rotation direction are exiting from the quarter wavelength plates 30 and 35, respectively.

The delay correction plate 60 corrects a difference in optical path length between an optical path A along which the polarized light B2a and B2a' travels and an optical path B along which the polarized light B2b and B2b' travels. The use of the polarization diversity prism 20 creates a difference in optical path length between the optical path A and the optical path B. In consideration of this, the delay correction plate 60 is arranged such that substantially the same optical path length is provided along the optical path A and along the optical path B. In the example illustrated in FIG. 2, the delay correction plate 60 is situated between the variable Faraday rotator 40 and the first reflector 50 along the optical path A.

The quarter wavelength plate 70 receives the transmitted light B3, and emits circularly polarized light. The quarter wavelength plate 70 further receives the circularly polarized light, and emits transmitted light B5 that is linearly polarized. The linear polarization of the transmitted light B3 and the linear polarization of the transmitted light B5 are orthogonal to each other. The quarter wavelength plate 70 is situated between the splitter 10 and the second reflector 80 along the optical path of the transmitted light B3 and B5, which may be referred to as a second optical path.

The second reflector 80, for example, may be a right-angle prism, for example. The second reflector 80 reflects the circularly polarized light exiting from the quarter wavelength plate 70 to make it travel in the Y-axis direction, and then reflects the light again to make it travel in the X-axis direction.

The splitter (optical coupler) 10 combines reflected light Bob of the reflected light B4 and transmitted light B5a of the transmitted light B5. The reflected light Bob and the transmitted light B5a are combined into signal light OUTPUT1. The splitter (optical coupler) 10 combines transmitted light B4a of the reflected light B4 and reflected light B5b of the transmitted light B5. The transmitted light B4a and the reflected light B5b are combined into signal light OUTPUT2.

Figure 3:
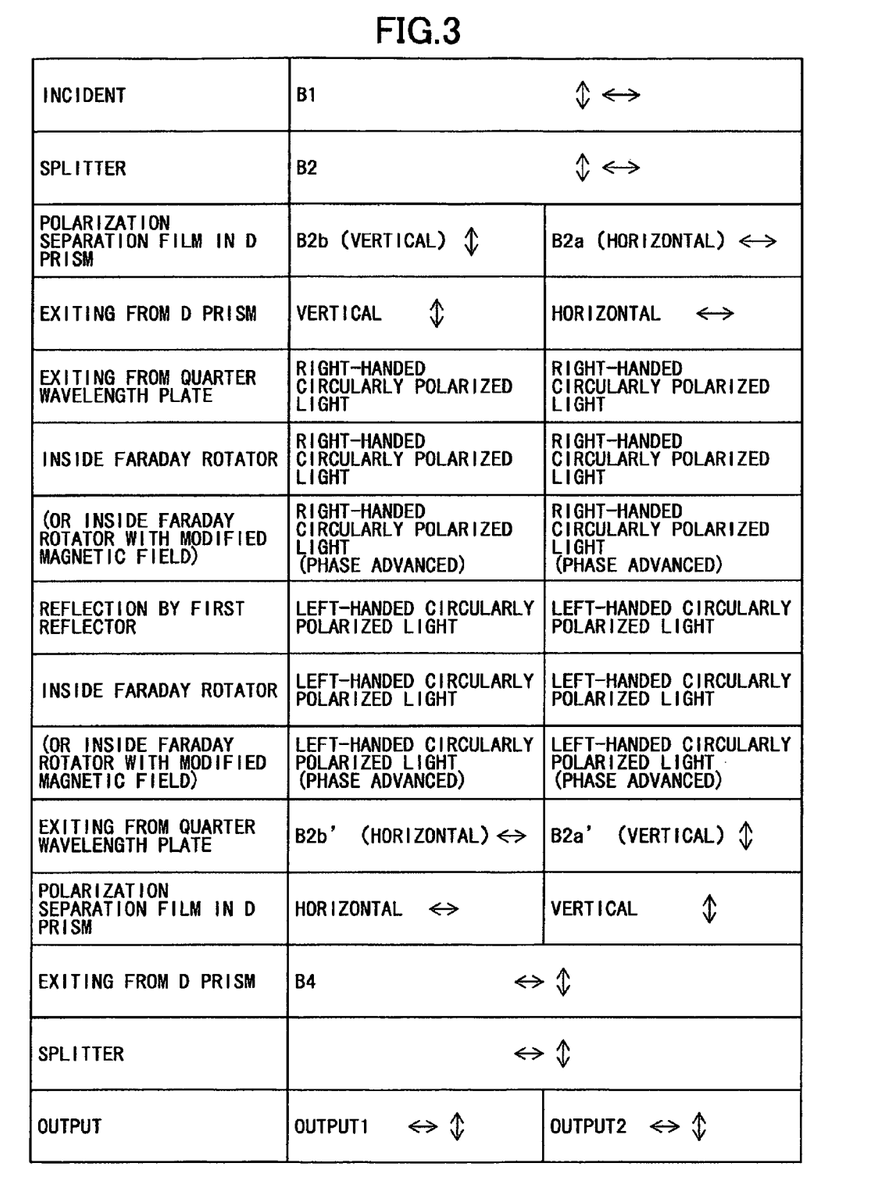
FIG. 3 is a drawing illustrating an example of the state of polarization along a first optical path.

In the following, a description will be given of the state of polarization at each stage along the first optical path and the second optical path of the delay interferometer illustrated in FIG. 2. FIG. 3 is a drawing illustrating an example of the state of polarization along the first optical path. The first optical path refers to the optical path along which the reflected light B2 reflected by the splitter 10 travels.

The incident light B1 is split by the splitter 10 into the reflected light B2 and the transmitted light B3. It is assumed that the incident light B1 has the state of polarization as illustrated in the row denoted as "INCIDENT" in FIG. 3. The incident light B1 includes vertically polarized light and horizontally polarized light. The incident light B1 is reflected by the splitter 10. The polarization state of the reflected light B2 is substantially the same as (i.e., the same as or similar to) the polarization state of the incident light B1.

The reflected light B2 is separated by the polarization separation film into the p-polarized light B2a and the s-polarized light B2b. As illustrated in FIG. 3, the p-polarized light B2a has the "horizontal" polarization state, and the s-polarized light B2b has the "vertical" polarization state. The polarization state of each polarized light exiting from the polarization diversity prism 20 is substantially the same as (i.e., the same as or similar to) its polarization state as existed immediately after the separation performed by the polarization separation film.

Polarized light beams separated by the polarization separation film are incident to the quarter wavelength plate 30 and the quarter wavelength plate 35, respectively, so that their polarization states change from linear polarization to circular polarization. Polarized light beams exiting from the quarter wavelength plate 30 and the quarter wavelength plate 35 are circularly polarized light beams having the same rotation direction (e.g., right-handed rotation) as illustrated in FIG. 3. The quarter wavelength plate 30 and the quarter wavelength plate 35 have their axis differing by approximately 90 degrees from each other, so that circularly polarized light beams exiting from the quarter wavelength plate 30 and the quarter wavelength plate 35, respectively, have the same rotation direction.

Light traveling in the variable Faraday rotator 40 maintains the substantially same polarization state, and is thus right-handed circularly polarized light as illustrated in FIG. 3. The variable Faraday rotator 40 is configured such that a RIG crystal serving as a magneto-optic crystal is magnetically saturated. The optical phase of the circularly polarized light thus advances due to the occurrence of Faraday rotation.

Figure 4:
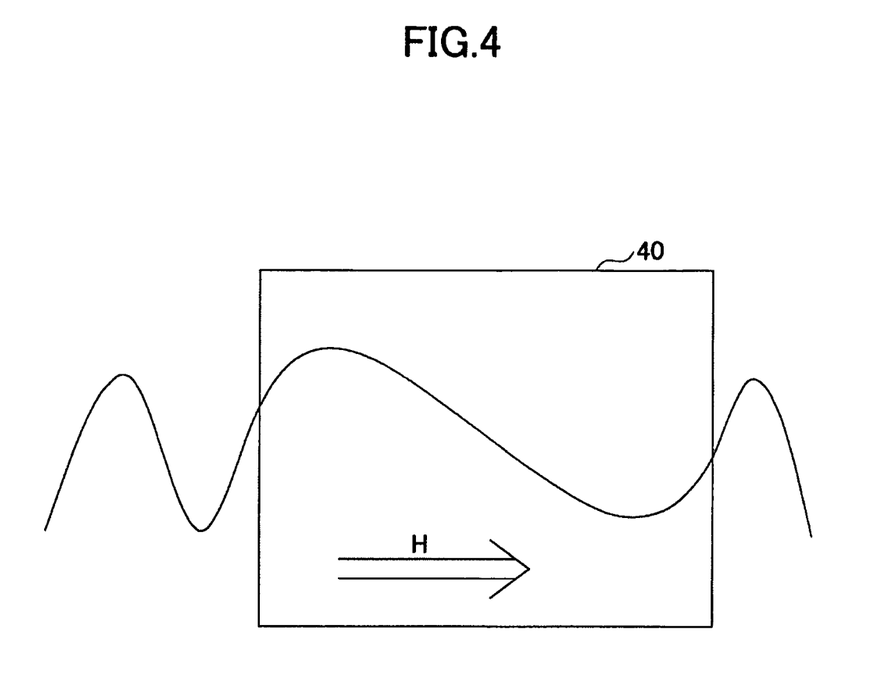
FIG. 4 is a drawing for illustrating phase advancement in a variable Faraday rotator.

FIG. 4 is a drawing for illustrating phase advancement in the variable Faraday rotator 40. As illustrated in FIG. 4, a magnetic field H is applied to advance the phase of circularly polarized light. With this arrangement, the variable Faraday rotator 40 may serve to adjust phase. It may be preferable to change the advancement of optical phase in the range of zero to the minimum symbol cycle.

The circularly polarized light exiting from the variable Faraday rotator 40 is reflected by the first reflector 50. At this time, the rotation direction is reversed due to reflection. Namely, the circularly polarized light reflected by the first reflector 50 is changed into left-handed circularly polarized light as illustrated in FIG. 3.

The circularly polarized light reflected by the first reflector 50 is then phase-adjusted by the variable Faraday rotator 40. The circularly polarized light exiting from the variable Faraday rotator 40 is changed into linearly polarized light by the quarter wavelength plate 30 or the quarter wavelength plate 35. At this time, the polarization state of each polarized light is orthogonal to the polarization state of the original linearly polarized light as illustrated in FIG. 3.

The polarized light exiting from the quarter wavelength plate 30 has s-polarization, and is thus reflected by the polarization separation film. The polarization state does not change at this time as illustrated in FIG. 3. The polarized light exiting from the quarter wavelength plate 35 has p-polarization, and thus passes through the polarization separation film. The polarization state does not change at this time as illustrated in FIG. 3.

When producing exiting signal light, the polarization diversity prism 20 combines the polarized light B2a' with the polarized light B2b' into the exiting, combined signal light B4. The polarization state of the signal light B4 is orthogonal to the polarization state of the incident light.

Figure 5:
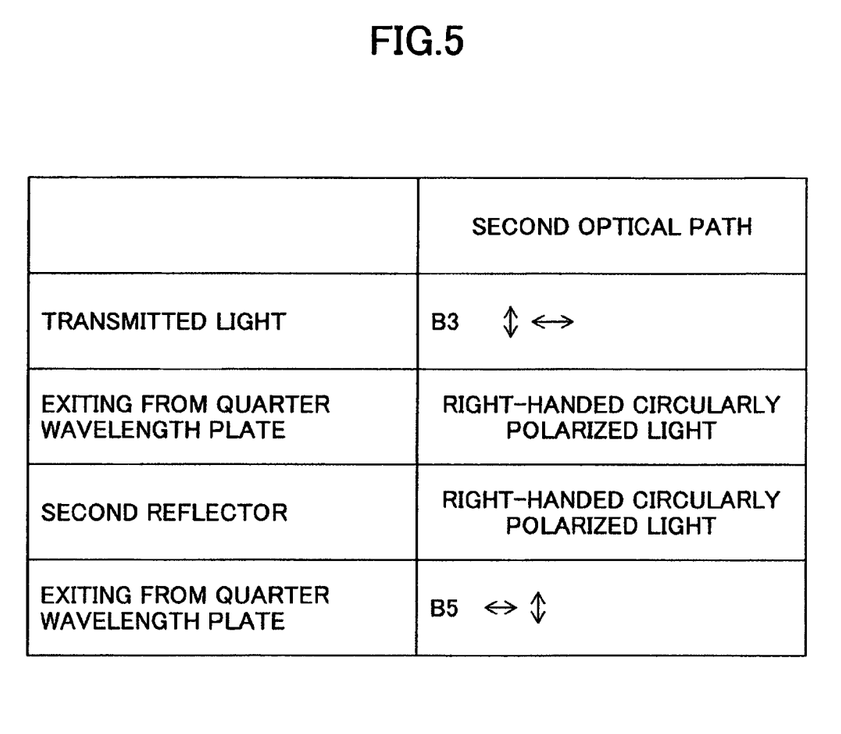
FIG. 5 is a drawing illustrating an example of the state of polarization along a second optical path.

In the following, a description will be given of polarization states along the second optical path. FIG. 5 is a drawing illustrating an example of the state of polarization along the second optical path. The second optical path refers to the optical path along which the transmitted light B3 passing through the splitter 10 travels. The transmitted light B3 having passed through the splitter 10 includes vertically polarized light and horizontally polarized light as illustrated in FIG. 5.

The transmitted light B3 is incident to the quarter wavelength plate 70 for conversion into right-handed circularly polarized light as illustrated in FIG. 5. The circularly polarized light exiting from the quarter wavelength plate 70 is reflected by the second reflector 80. At this time, the direction of rotation is reversed when the light is reflected into the Y-axis direction, and is further reversed when the light is reflected into the X-axis direction. As a result, the circularly polarized light exiting from the second reflector 80 is right-handed circularly polarized light.

The circularly polarized light exiting from the second reflector 80 is incident to the quarter wavelength plate 70 for conversion into linearly polarized light. The transmitted light B5 exiting from the quarter wavelength plate 70 is orthogonal to the transmitted light B3 that is incident to the quarter wavelength plate 70 (see FIG. 5).

The delay interferometer described herein is thus able to set the polarization state of the light B4 illustrated in FIG. 3 substantially equal to the polarization state of the light B5 illustrated in FIG. 5. Accordingly, interference occurs between the signal light outputs OUTPUT1 and OUTPUT2 exiting from the splitter 10.

Figure 6:
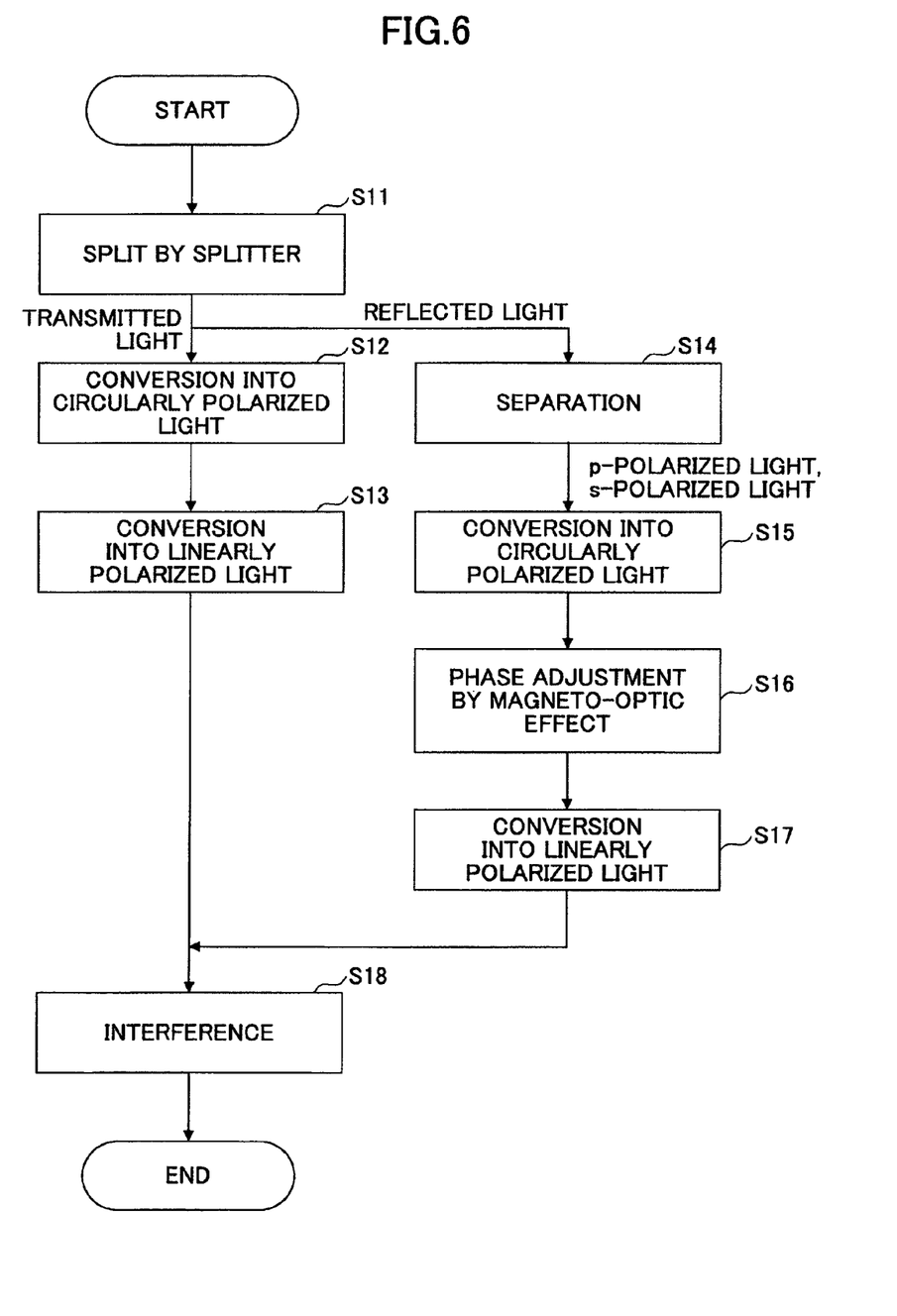
FIG. 6 is a flowchart illustrating the method of producing delayed interference according to the first embodiment.

In the following, a description will be given of a method of producing delayed interference according to the first embodiment. FIG. 6 is a flowchart illustrating the method of producing delayed interference according to the first embodiment. In step S11 illustrated in FIG. 6, signal light is split by the splitter 10 into the transmitted light B3 and the reflected light B2.

In step S12, the transmitted light B3 is converted by the quarter wavelength plate 70 into circularly polarized light. The circularly polarized light is reflected by the second reflector 80 towards the quarter wavelength plate 70. In step S13, the circularly polarized light is converted into the transmitted light B5 having linear polarization. Upon this conversion, the polarization state of the transmitted light B3 and the polarization state of the transmitted light B5 are orthogonal to each other.

In step S14, the reflected light B2 is separated by the polarization diversity prism 20 into the p-polarized light B2a and the s-polarized light B2b. In step S15, the p-polarized light B2a and the s-polarized light B2b are incident to the quarter wavelength plate 30 and the quarter wavelength plate 35, respectively, for conversion into respective circularly polarized light beams. Provision is made such that these circularly polarized light beams have the same rotation direction.

In step S16, the circularly polarized light beams are phase-adjusted by the variable Faraday rotator 40 utilizing a magneto-optic effect. Phase adjustment is also performed with respect to the circularly polarized light beams reflected by the first reflector 50.

In step S17, the circularly polarized light beams that are phase-adjusted by traveling back and forth through the variable Faraday rotator 40 are incident to the quarter wavelength plate 30 and the quarter wavelength plate 35, respectively, for conversion into respective linearly polarized light beams. When this happens, the p-polarized light B2a is changed into the s-polarized light B2a', and the s-polarized light B2b is changed into the p-polarized light B2b'. The s-polarized light B2a' and the p-polarized light B2b' are combined upon exiting from the polarization diversity prism 20 to be incident to the splitter 10 as the reflected light B4.

In step S18, the transmitted light B5 and the phase-adjusted reflected light B4 interfere with each other at the splitter 10.

As described above, the delay interferometer of the first embodiment causes one of the two signal light beams traveling along respective optical paths to be optically phase-shifted by use of a magneto-optic effect, and then combines these signal light beams. With this arrangement, faster response speed is achieved by the delay interferometer utilizing a magneto-optic effect to perform phase adjustment, compared with the phase adjustment performed by a delay interferometer utilizing temperature control. According to the first embodiment, further, electrical power consumption is reduced compared with a delay interferometer utilizing temperature control for phase adjustment.

In the first embodiment, quarter wavelength plates are used as wavelength plates. However, these plates do not have to be exactly a quarter wavelength plate. This is because the variable Faraday rotator 40 can perform phase adjustment also with respect to elliptic polarization. It may also be noted, however, that a quarter wavelength plate capable of converting linearly polarized light into circularly polarized light may be preferable for use in the disclosed delay interferometer.

The first embodiment is configured such that an optical phase shift is imposed on the reflected light B2 reflected by the splitter 10. Alternatively, an optical phase shift may be imposed on the transmitted light B3.

Second Embodiment

In the following, a description will be given of a receiver according to a second embodiment. The receiver of the second embodiment utilizes the delay interferometer of the first embodiment. Before describing the configuration of the receiver, PDFS (i.e., polarization dependent frequency shift) will be described first.

PDFS refers to a phenomenon by which the optical frequency (or wavelength) subjected to interference deviates due to a difference in optical path length between polarized light beams that are to interfere with each other. In a delay interferometer, there are many different factors that cause a difference in optical path length through polarization. It may be preferable to eliminate such a difference in optical path length caused by polarization. In the delay interferometer described in the first embodiment, two light beams travel through the variable Faraday rotator, so that these beams are susceptible to the effect of magnetic field distribution in the variable Faraday rotator. A slight difference in Faraday rotation angles between these two light beams (i.e., two optical paths) results in the interfering optical frequencies being different from each other, thereby causing PDFS in the delay interferometer.

As a countermeasure against PDFS, a magnet is provided in the vicinity of the variable Faraday rotator, thereby applying asymmetric magnetic field to the optical paths. In the second embodiment, a signal obtained from interference by the delay interferometer is monitored, and an electric current applied to the magnet is adjusted in response to the monitored results, thereby reducing PDFS in the two optical paths. In the following, the adjustment of electric current applied to the magnet based on the monitor results is referred to as automatic feedback control.

Figure 7:
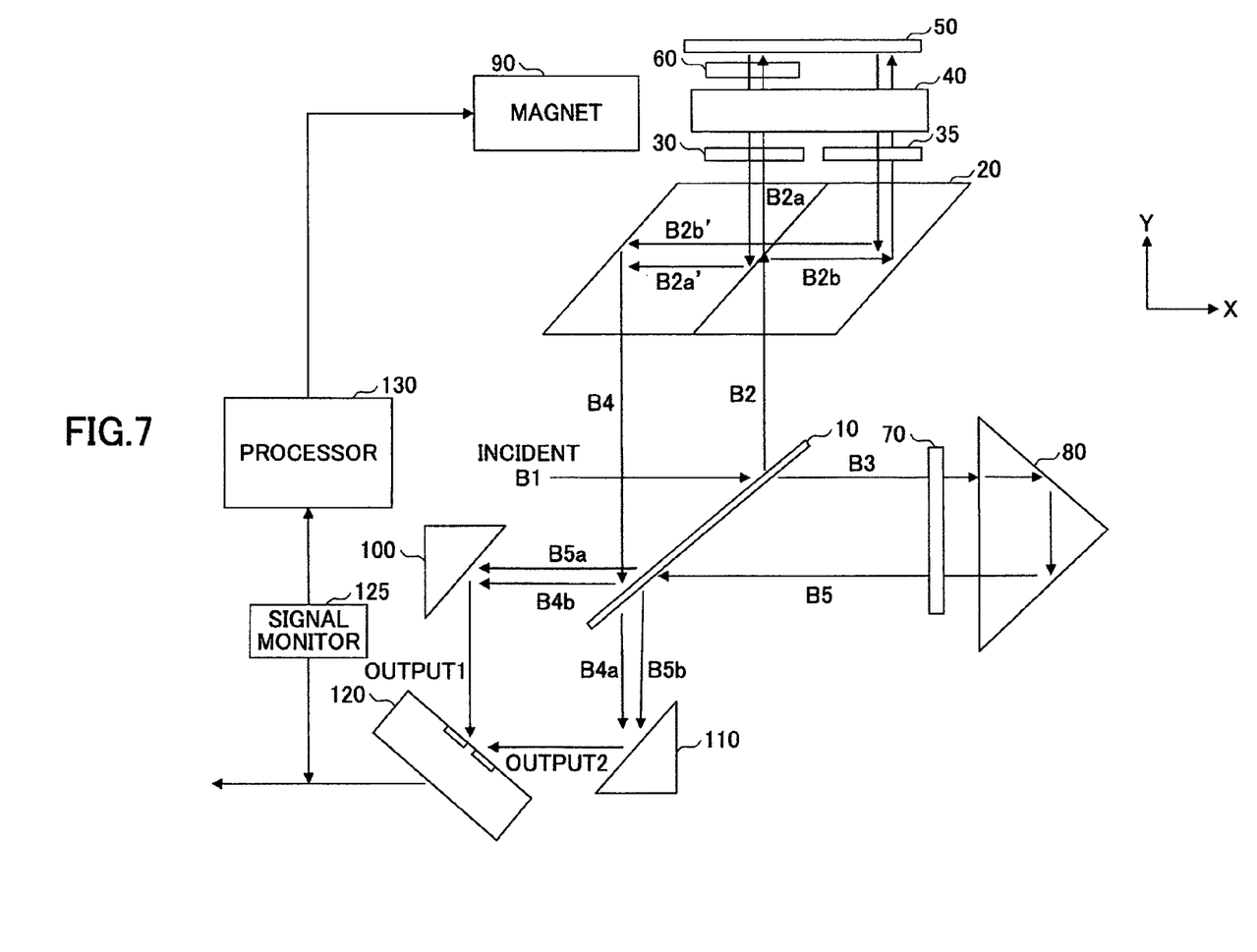
FIG. 7 is a drawing illustrating an example of the configuration of a receiver according to a second embodiment.

FIG. 7 is a drawing illustrating an example of the configuration of the receiver according to the second embodiment. The receiver of the second embodiment includes a delay interferometer 15 of the first embodiment, a third reflector 100, a fourth reflector 110, a light receiver 120, a signal monitor 125, a processor 130, and a magnet 90. The delay interferometer is the same as or similar to that of the first embodiment, and a description thereof will be omitted.

The third reflector 100 reflects the light OUTPUT1 comprised of the combined reflected light Bob and transmitted light B5a towards the light receiver 120. The third reflector 100, for example, may be a mirror.

The fourth reflector 110 reflects the light OUTPUT2 comprised of the combined transmitted light B4a and reflected light B5b towards the light receiver 120. The fourth reflector 110, for example, may be a mirror.

The light receiver 120 uses two photo-detectors to detect the interference signals OUTPUT1 and OUTPUT2 for the purpose of producing an electrical signal. The light receiver 120 may be any light receiver as long as two photo-detectors are used.

The signal monitor 125 monitors an electrical signal output from the light receiver 120. As will be described below in detail, a DC bias is applied to the signal monitor 125 and the optical delay interferometer in order to allow the signal monitor 125 to monitor a DC electric current corresponding to the electrical signal.

The signal monitor 125 monitors quality criteria corresponding to the electrical signal. According to one embodiment, these quality criteria, for example, may include a bit error rate (BER), an extinction factor, a light power, etc. Any criteria indicative of quality of the electrical signal or another relevant signal may be used. The signal monitor 125 may be any device that monitors a signal, such as an RF monitor, a DC monitor, a transimpedance amplifier, or the like.

The processor 130 adjusts an electric current applied to the magnet 90 based on information indicative of the quality criteria that are monitored. Information indicative of the quality criteria may be a value or values of the quality criteria, an indication of a change, a value of a change, an indication of exceedance over a preset level or threshold, or the like. For example, the processor 130 may receive a measured value of an extinction factor, and may supply this measured value as a feedback signal to the unit that controls an electric current applied to the magnet 90.

The processor 130 controls an electric current applied to the magnet 90 of the delay interferometer 15 based on information indicative of the quality criteria supplied from the signal monitor 125. The processor 130 has proper logic functions in the form of hardware or software.

Figure 8:
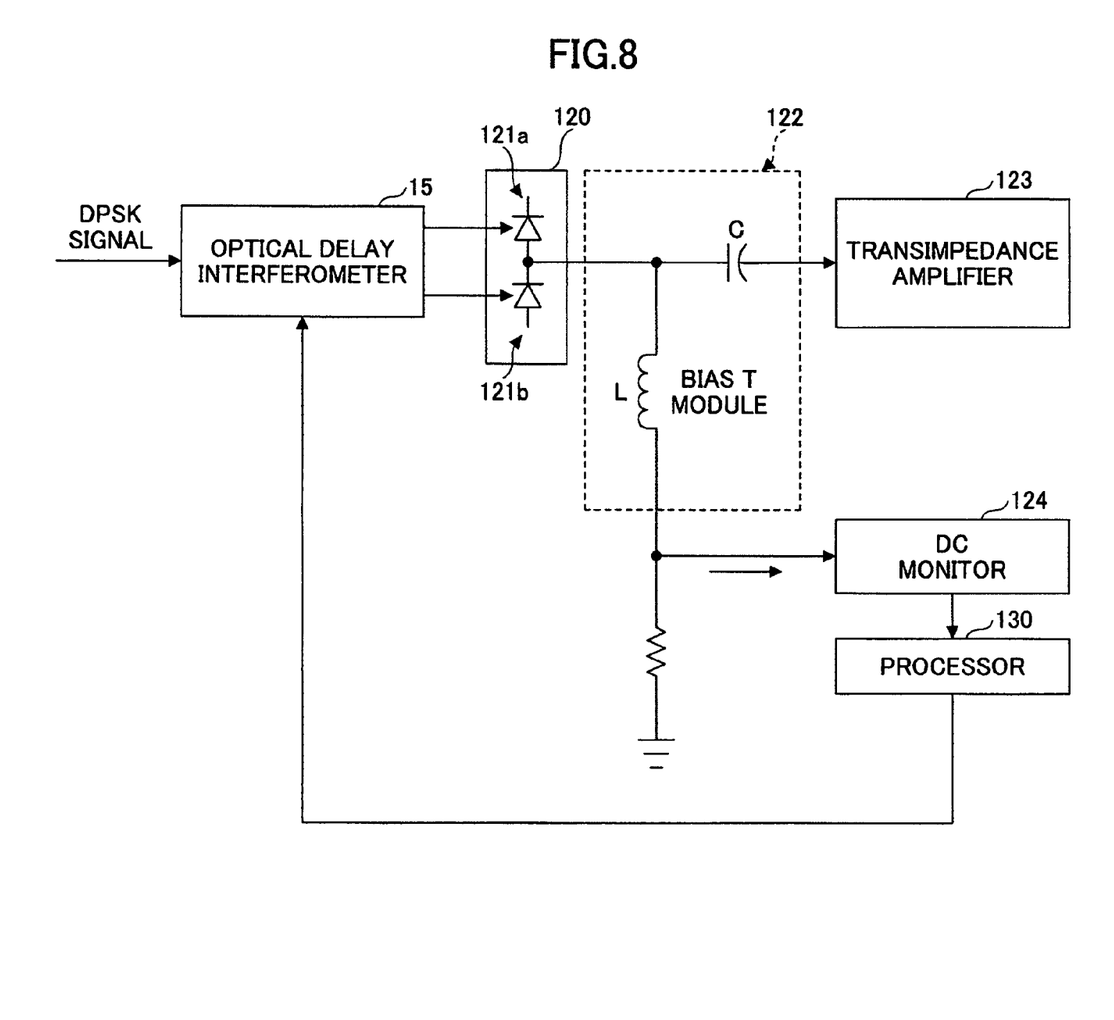
FIG. 8 is a block diagram illustrating an example of automatic feedback control that utilizes light power monitoring.

In the following, a specific example of the signal monitor 125 will be described. FIG. 8 is a block diagram illustrating an example of automatic feedback control that utilizes light power monitoring. In the second embodiment, the power of the output light of the delay interferometer 15 may be used to adjust or optimize the relative delay or phase difference of the delay interferometer 15.

The light-port outputs of the delay interferometer 15 are detected by photo-detectors 121a and 121b of the light receiver 120, respectively, thereby generating a balanced electrical signal. The electrical signal is separated by a bias T module 122. This bias T module 122 serves to separate high-frequency components from low-frequency components of the electrical signal. The high-frequency components are received by a transimpedance amplifier 123, and the low-frequency components (inclusive of a DC component) are received by a DC monitor 124.

The DC monitor 124 measures the DC voltage. This DC voltage may be proportional to an average of differences in optical power between the signals detected by the photo-detectors 121a and 121b. Based on the average power differential, the processor 130 may determine a feedback signal for controlling the electric current applied to the magnet 90.

As another example, the DC monitor 124 illustrated in FIG. 8 may be modified to include a forward error correction (FEC) mechanism in order to monitor a bit error rate corresponding to the electrical signal. The processor 130 may use this bit error rate in order to eliminate PDFS in the delay interferometer 15. Each function may be implemented by use of logic provided in the form of software or hardware or in any form, or by use of logic provided in a combination of two or more of these forms. In the second embodiment, a conventional technique for monitoring quality criteria based on an electrical signal may be used to determine a feedback signal for controlling the electric current applied to the magnet 90.

Figure 9:
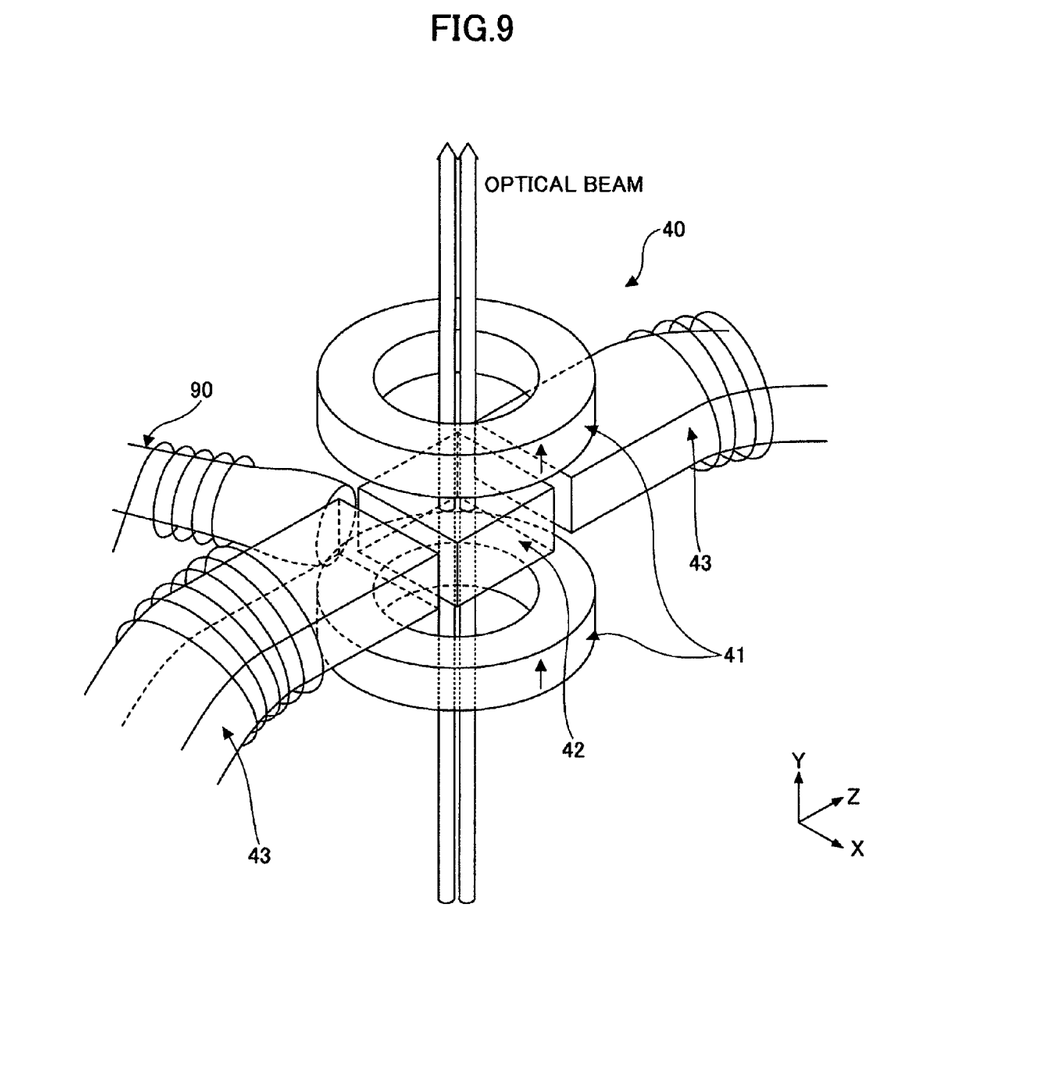
FIG. 9 is a drawing illustrating an example of the positional relationship between a variable Faraday rotator and a magnet.

In the following, the positional relationship between the variable Faraday rotator 40 and the magnet 90 will be described. FIG. 9 is a drawing illustrating an example of the positional relationship between the variable Faraday rotator 40 and the magnet 90. As illustrated in FIG. 9, a magneto-optic crystal 42 is placed between ring-shape magnets 41 in a travel direction (Y-axis direction) of signal light. The magneto-optic crystal 42 is further placed between two magnets 43 in the X-Z plane. The magnet 90 is provided for the purpose of applying an asymmetrical magnetic field to two signal light beams passing through the magneto-optic crystal 42.

An electric current applied to the magnet 90 is adjusted based on a feedback signal, so that Faraday rotation angles of the two signal light beams are balanced to reduce PDFS. Specifically, the electric current controller for controlling the electric current applied to the magnet 90 receives the feedback signal from the processor 130 to adjust the electric current.

According to the second embodiment described above, the magnet is provided for the purpose of correcting PDFS occurring in the delay interferometer, thereby reducing PDFS. In the second embodiment, the electric current applied to the magnet is controlled based on a combined interference signal, which is continuously monitored to maintain PDFS at low level.

Third Embodiment

Figure 10:
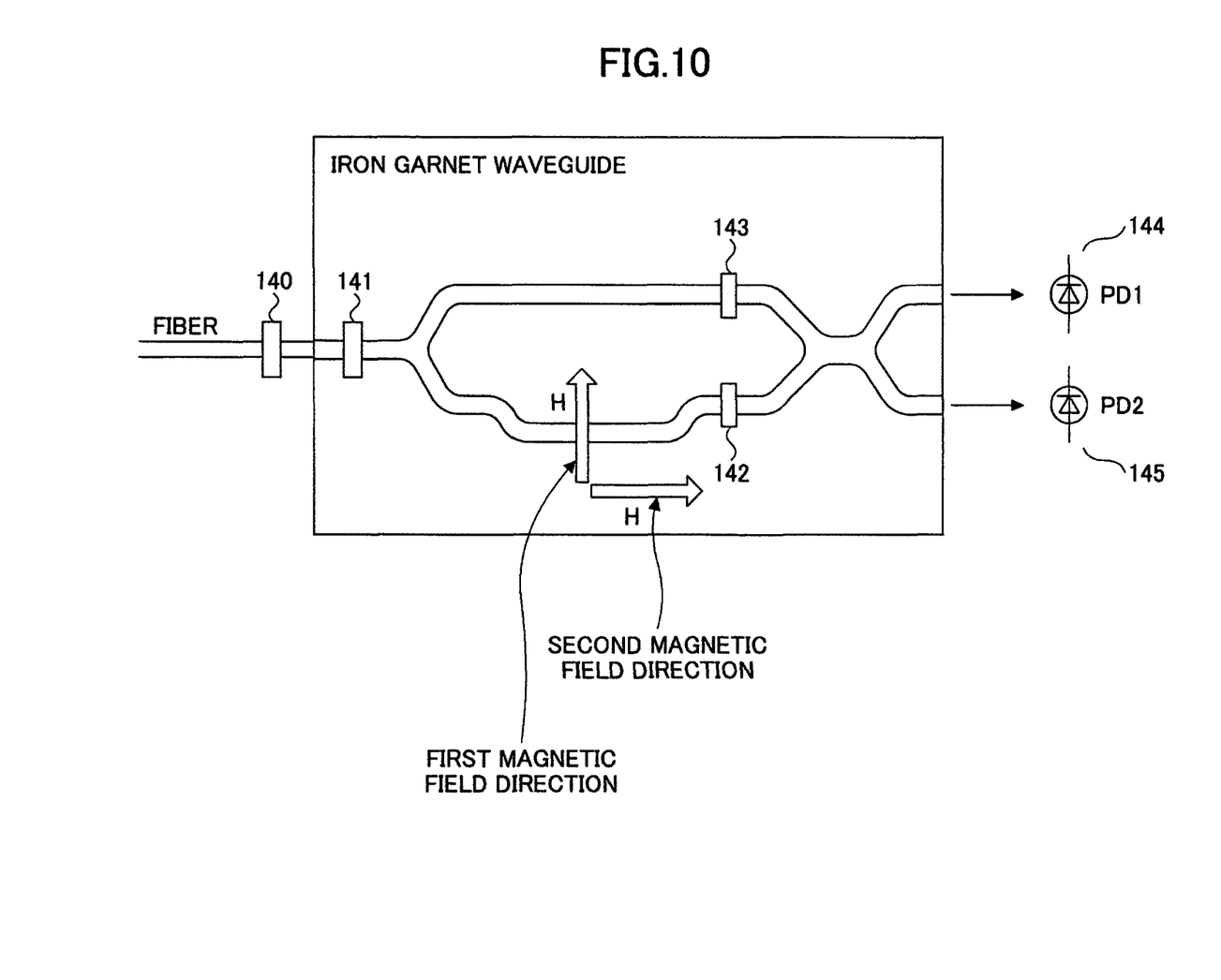
FIG. 10 is a drawing illustrating an example of the configuration of a delay interferometer according to a third embodiment.

In the following, a description will be given of another type of delay interferometer according to a third embodiment. In the previous embodiments, a delay interferometer of an asymmetrical Mickelson type has been used. In the third embodiment, a delay interferometer of a Mach-Zehnder type is used. FIG. 10 is a drawing illustrating an example of the configuration of a delay interferometer according to the third embodiment.

An iron-garnet waveguide is used in the third embodiment in order to utilize a magneto-optic effect. An iron-garnet waveguide is crated by forming a yttrium iron garnet film on a gadolinium gallium garnet substrate by use of liquid phase epitaxy, for example.

A polarization controller 140 illustrated in FIG. 10 converts signal light traveling through an optical fiber into linearly polarized light, which is then incident to the iron garnet waveguide. A quarter wavelength plate 141 converts the signal light incident to the iron garnet waveguide into circularly polarized light. The circularly polarized light is split into a first optical path and a second optical path.

In the example illustrated in FIG. 10, the first optical path is configured to be longer than the second optical path such that a delay corresponding to a symbol cycle is imposed. In order to perform optical phase adjustment along the first optical path, magnetic fields are applied in a first magnetic field direction and a second magnetic field direction as illustrated in FIG. 10. Electric currents are applied to a first electric magnet and a second electric magnet illustrated in FIG.

Figure 11:
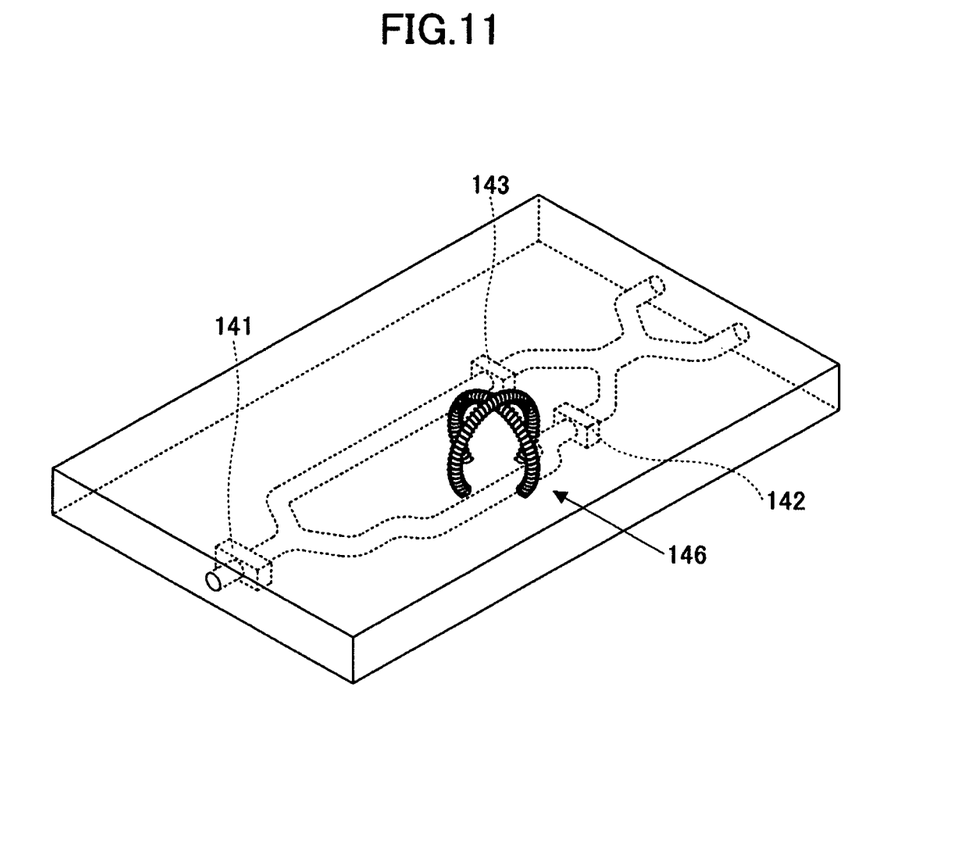
FIG. 11 is a drawing illustrating an example of the positional relationship between electric magnets and an iron garnet waveguide.
Figure 12:
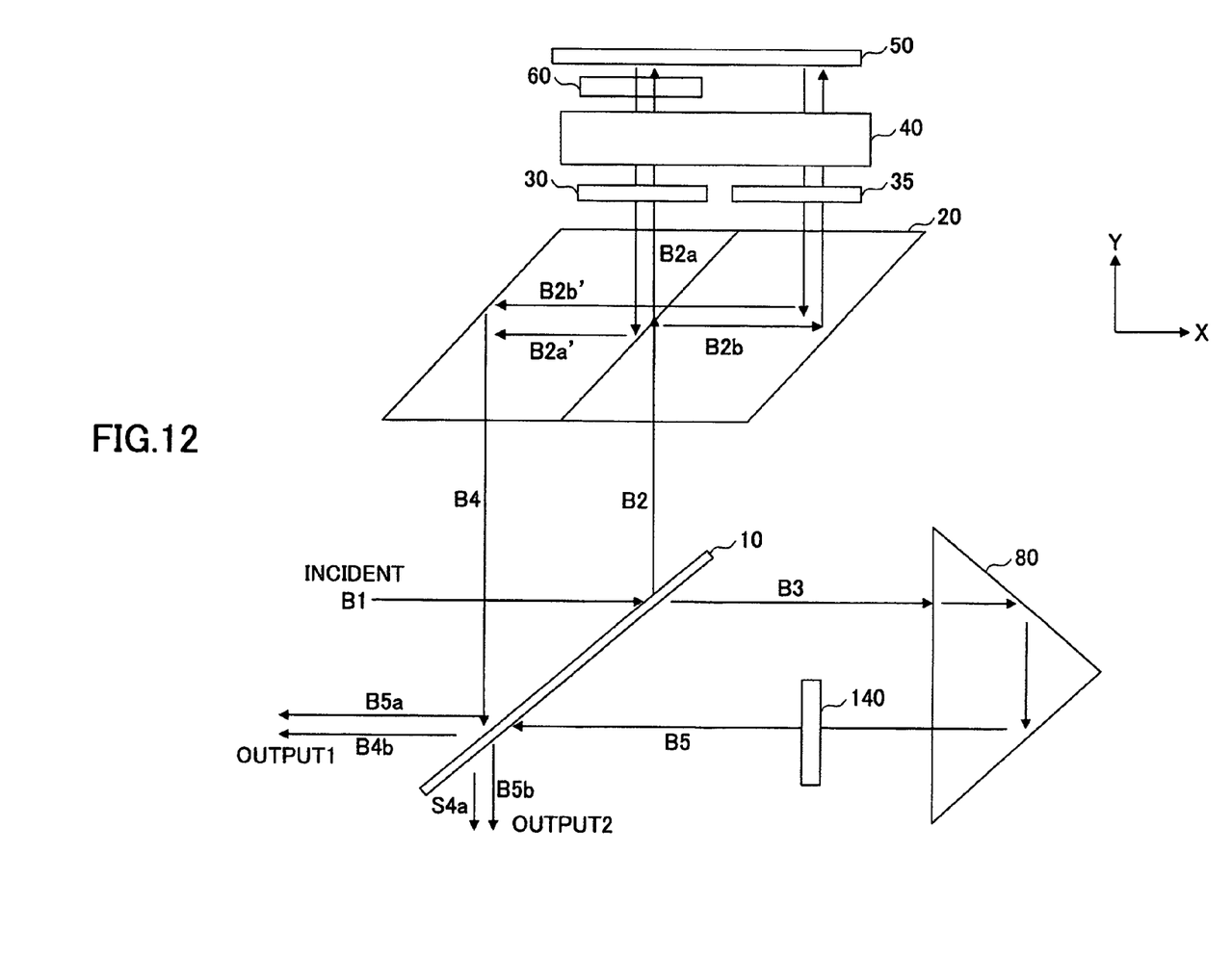
FIG. 12 is a drawing illustrating an example of the configuration of a delay interferometer according to a variation.

11, thereby generating magnetic fields in a first magnetic field direction and a second magnetic field direction as illustrated in FIG. 10.

FIG. 11 is a drawing illustrating an example of the positional relationship between the electric magnets and the iron garnet waveguide. In the example illustrated in FIG. 11, two electric magnets 146 are crossed with each other and placed over the waveguide in order to apply magnetic fields in the magnetic field directions illustrated in FIG. 10. Electric magnets may be provided for the other waveguide for which the electric magnets 146 are not provided as illustrated in FIG. 11, thereby applying magnetic fields in opposite directions to the magnetic fields of the electric magnets 146.

The first and second electric magnets may be located on a buffer film (e.g., silicon film) that is provided for the purpose of refraining from absorbing signal light traveling through the waveguide. The first and second electric magnets may be located at some distance from the iron garnet waveguide.

A quarter wavelength plate 142 converts the circularly polarized light that is phase-adjusted along the first optical path into linearly polarized light. A quarter wavelength plate 143 converts the circularly polarized light of the second optical path into linearly polarized light. The signal light beams converted into linear polarization are then combined to interfere with each other, thereby producing intensity-modulated light.

Two photo-diodes (PD1 and PD2) 144 and 145 receive the intensity-modulated signal light for conversion into an electrical signal.

Instead of using an iron garnet waveguide, mirrors may be arranged on a substrate to form a spatial optical system that splits signal light into two paths, thereby performing delayed interference. A variable Faraday rotator described in the first embodiment may be located along one of the optical paths to perform optical phase adjustment.

[Variation]

In the following, a variation of the first embodiment will be described. In this variation, a half wavelength plate 140 having an optical axis at an angle of n/4 may be provided in place of the quarter wavelength plate 70 along the optical path of transmitted light. FIG. 11 is a drawing illustrating an example of the configuration of a delay interferometer according to the variation. In this variation of the delay interferometer, the linearly polarized light rotates by 90 degrees along the optical path of transmitted light, resulting in substantially the same polarization state (i.e., same or similar polarization state) as that of the reflected light. Consequently, the transmitted light B5 and the reflected light B4 interfere with each other at the splitter 10. The half wavelength plate 140 may alternatively be placed on the optical path of the transmitted light B3.

According to the embodiments and variation described above, the delay interferometer consumes less electric power than a delay interferometer utilizing temperature control.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A delay interferometer, comprising:
    first and second optical paths into which incident signal light is split;
    a first converter including one or more conversion parts to convert the signal light on the first optical path into circularly polarized light and to convert the circularly polarized light into linearly polarized signal light;
    a phase adjuster to shift an optical phase of the circularly polarized light through a magneto-optic effect, the phase adjuster being a variable Faraday rotator; and
    a second converter to convert a polarization state of the signal light on the second optical path into substantially the same polarization state as a polarization state of the linearly polarized signal light.

2. The delay interferometer as claimed in claim 1, further comprising:
    a splitter to split the incident signal light into first split light on the first optical path and second split light on the second optical path;
    a first reflector situated on the first optical path to reflect the first split light on the first optical path towards the splitter; and
    a second reflector situated on the second optical path to reflect the second split light on the second optical path towards the splitter,
    wherein the splitter further serves as a coupler to combine the first split light on the first optical path and the second split light on the second optical path into combined signal light,
    wherein the variable Faraday rotator is situated between the splitter and the first reflector,
    and wherein the first converter includes one or more wavelength plates situated between the variable Faraday rotator and the splitter.

3. The delay interferometer as claimed in claim 2, further comprising:
    a polarization separator situated between the coupler and the wavelength plates to divide the first split light into two polarized light beams having different polarizations,
    and the wavelength plates are located on paths of the two polarized light beams, respectively, and have optical axis directions different from each other.

4. The delay interferometer as claimed in claim 3, wherein the polarization separator includes a prism having a polarization separation film.

5. The delay interferometer as claimed in claim 4, wherein a positional displacement between an outbound optical path and a return optical path created by the prism is substantially equal to a positional displacement between an outbound optical path and a return optical path created by the second reflector.

6. The delay interferometer as claimed in claim 3, further comprising:
    an electric magnet to apply a magnetic field to at least one of the two polarized light beams; and
    a controller to control an electric current applied to the electric magnet based on the combined signal light combined by the coupler.

7. The delay interferometer as claimed in claim 1, wherein the variable Faraday rotator is configured such that a magneto-optic crystal is maintained in a magnetically saturated state to rotate a magnetization direction.

8. A receiver, comprising:
   the delay interferometer of claim 1; and
   a light receiver including two light detecting elements that detect two combined signal lights output from the delay interferometer, the light receiver converting the two combined signal lights into an electrical signal.

9. The delay interferometer as claimed in claim 1, wherein the variable Faraday rotator is configured to apply a magnetic field to a magneto-optic crystal to advance the optical phase of the circularly polarized light in order to variably adjust the optical phase.

10. A method of producing delayed interference, comprising:
   splitting incident signal light into first light and second light;
   converting the first light into circularly polarized light;
   adjusting an optical phase of the circularly polarized light through a magneto-optic effect by utilizing a variable Faraday rotator;
   converting the phase-adjusted circularly polarized light into linearly polarized light;
   placing the second light in substantially the same polarization state as a polarization state of the linearly polarized light; and
   causing the linearly polarized light and the second light having substantially the same polarization state to interfere with each other.

\* \* \* \* \*